United States Patent
Kobayashi et al.

(10) Patent No.: US 7,027,895 B2
(45) Date of Patent: Apr. 11, 2006

(54) FORCE FEEDBACK INPUT DEVICE

(75) Inventors: Ayumu Kobayashi, Miyagi-ken (JP);
Ken Shibazaki, Miyagi-ken (JP);
Noriyuki Fukushima, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 106 days.

(21) Appl. No.: 10/880,672

(22) Filed: Jun. 30, 2004

(65) Prior Publication Data

US 2005/0007340 A1    Jan. 13, 2005

(30) Foreign Application Priority Data

Jul. 8, 2003    (JP) .............................. 2003-193694

(51) Int. Cl.
*G01M 1/38* (2006.01)
*H02P 7/00* (2006.01)

(52) U.S. Cl. ..................... 700/275; 700/83; 700/264; 74/335

(58) Field of Classification Search .................. 700/17, 700/83, 85, 90, 95, 264, 275; 74/335, 473.3
See application file for complete search history.

(56) References Cited

U.S. PATENT DOCUMENTS

| 4,265,345 | A | * | 5/1981 | Fasano ........................ 477/194 |
| 4,283,722 | A | * | 8/1981 | Kito et al. ................... 340/685 |
| 5,663,622 | A | * | 9/1997 | Sekiguchi .................... 318/563 |
| 5,952,806 | A | * | 9/1999 | Muramatsu ............. 318/568.12 |
| 6,959,232 | B1 | * | 10/2005 | Sanpei et al. ............... 700/275 |
| 2002/0020236 | A1 | * | 2/2002 | Onodera ....................... 74/335 |

FOREIGN PATENT DOCUMENTS

JP    2002-149324    5/2002

* cited by examiner

*Primary Examiner*—Jayprakash N. Gandhi
(74) *Attorney, Agent, or Firm*—Brinks Hofer Gilson & Lione

(57) ABSTRACT

A force feedback input device includes an operation member having a shaft and operated by an operator, detection means, such as a rotary encoder, for detecting an operating status of the operation member, an actuator for providing force feedback to the operation member, control means for controlling the actuator based on a detection signal output from the detection means, and stopper means for restricting displacement of the operation member in a predetermined operational direction. The stopper means includes a ratchet mechanism to disengage ratchets from corresponding gear teeth in response to the detection signal from the detection means.

3 Claims, 1 Drawing Sheet

FORCE FEEDBACK INPUT DEVICE

This application claims the benefit of priority to Japanese Patent Application No. 2003-193694, herein incorporated by reference.

BACKGROUND OF THE INVENTION

1. Field of the Invention

The present invention relates to a force feedback input device in which force feedback is provided to an operation member of the force feedback input device in accordance with the operating status and, in particular, to a stopper mechanism to restrict excessive displacement of the operation member.

2. Description of the Related Art

As input devices applied to, for example, a central "by-wire" control system of in-car electronic devices, a steer-by-wire steering system, a shift-by-wire gear change system, and a brake-by-wire braking system, force feedback input devices are known which includes an operation member that an operator manually operates, detection means, such as a position sensor, for detecting the operating status of the operation member, an actuator for providing force feedback to the operation member, and control means for controlling the actuator based on detection signals output from the detection means (refer to, for example, Japanese Unexamined Patent Application Publication No. 2002-149324, in particular, pages 3 to 5, and FIG. 3). Such force feedback input devices can provide various types of force feedback to the operation member in accordance with the direction and amount of movement of the operation member, and thereby can provide desired operation feeling to operations of the by-wire devices.

In these force feedback input devices, when the operation member is operated to an allowed maximum displacement, further displacement must be limited. To limit the displacement, a simple stopper mechanism is widely employed in which part of the operation member is brought into contact with a stopper fixed at a predetermined position.

Unfortunately, in the case where the allowed operations range, namely, the moving range of the operation member varies in accordance with use conditions, a stopper mechanism capable of changing the position of the stopper is essential to restrict excessive displacement of the operation member. In one known force feedback input device having this type of stopper, a rotary motor functions as an actuator that provides feedback force, such as sense of resistance, to the operation member, and the resistance force is increased by applying a large electric current to the motor when the operation member is displaced to an allowed limit of the operation range. However, since the known force feedback input device must apply a large electric current every time the operation member is displaced to an allowed limit of the operation range, power consumption is undesirably increased, which is a problem. In addition, the control method that increases the resistance force by applying a large electric current to the motor does not produce a distinct sense indicating that no more displacement of the operation member is possible, also referred to as "wall effect". Consequently, this method does not provide satisfactory operability.

Some force feedback input devices are proposed to restrict undesirably increased power consumption by providing an electromagnetic brake, separately from the motor which provides force feedback to the operation member. According to this proposal, since the electromagnetic brake can easily produce a large braking force, the displacement of the operation member can be instantly stopped at a predetermined position. In practice, the reverse displacement of the operation member whose excessive displacement is limited must not be restricted. As a result, the braking force of the electromagnetic brake must not be too strong and, therefore, this force feedback input device cannot provide satisfactory operability.

SUMMARY OF THE INVENTION

Accordingly, it is an object of the present invention to provide a force feedback input device that can limit the excessive displacement of an operation member at a stopper position while providing a wall effect, can appropriately change the stopper position, and can reduce power consumption.

According to the present invention, a force feedback input device includes an operation member operated by an operator, detection means for detecting an operating status of the operation member, an actuator for providing force feedback to the operation member, control means for controlling the actuator based on a detection signal output from the detection means, and stopper means for restricting displacement of the operation member in a predetermined operational direction. The stopper means has a ratchet mechanism to disengage a ratchet from gear teeth and the disengagement is performed based on the detection signal.

In the force feedback input device including the stopper means with the ratchet mechanism, at the moment when the detection means detects the displacement of the operation member that is exceeding the allowed operation limit, the ratchet of the stopper means is engaged with the corresponding gear teeth. As a result, this instantly restricts excessive displacement of the operation member while allowing the operation member to be displaced in the opposite direction (a "push back" operation) and, therefore, produces a wall effect and superior operability. Additionally, since a large electric current is not required for disengaging the ratchet from the gear teeth, the stopper means can be operated at low power consumption. Furthermore, if the allowed operation range of the operation member is altered, a stopping position of the operation member can be readily changed by controlling a driving signal for the ratchet mechanism of the stopper means.

In the force feedback input device, the gear teeth of the ratchet mechanism in the stopper means are preferably mounted on the operation member, and thereby the ratchet mechanism has a simple and reliable structure in which a ratchet is disengaged from the gear teeth movable along with the operation member.

Additionally, in the force feedback input device according to the present invention, the ratchet mechanism of the stopper means may include a first ratchet for restricting displacement of the operation member in one direction and a second ratchet for restricting displacement of the operation member in the opposite direction. The first ratchet can be engaged with corresponding gear teeth when the operation member is operated and is displaced to the allowed limit of the operation range in one direction. Also, the second ratchet can be engaged with corresponding gear teeth when the operation member is operated and is displaced to the allowed limit of the operation range in the opposite direction. Accordingly, the movement of the operation member can be reliably restricted at both ends of the operation range with a wall effect.

DESCRIPTION OF THE PREFERRED EMBODIMENT

Figure 1:
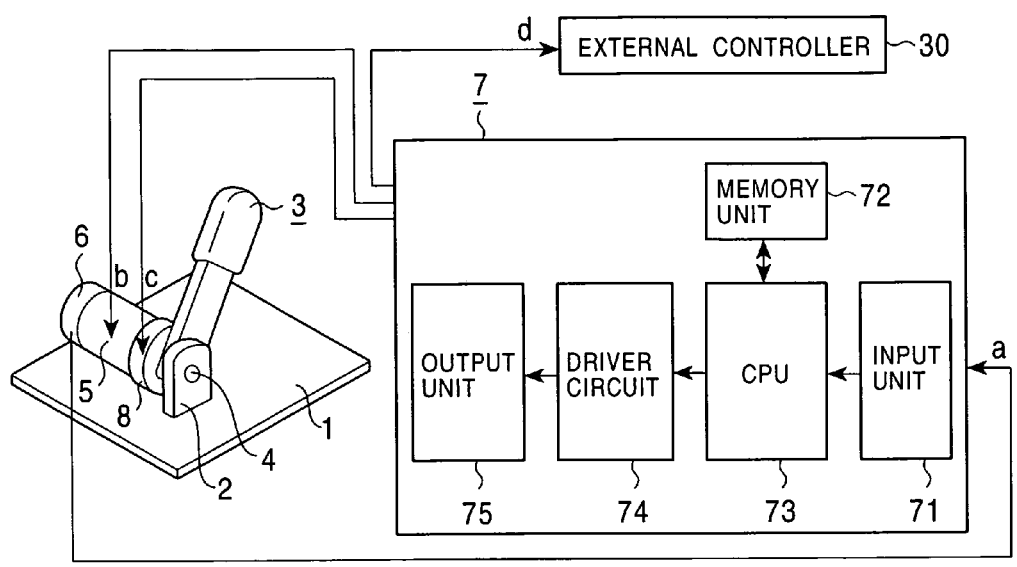
FIG. 1 is a block diagram of the entire force feedback input device according to an embodiment of the present invention.
Figure 2:
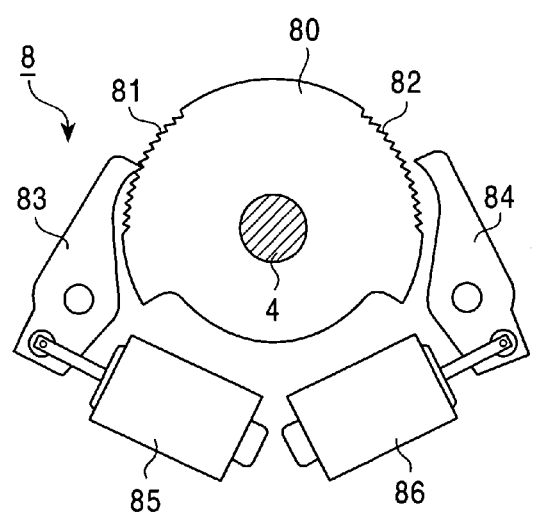
FIG. 2 is a view of a relevant portion of stopper means in the force feedback input device.

An embodiment of the present invention will now be described with reference to the accompanying drawings. FIG. 1 is a block diagram of the entire force feedback input device according to the embodiment. FIG. 2 is a view of a relevant portion of stopper means in the force feedback input device.

In the force feedback input device according to the embodiment, an operation member is pivotally operated by hand. The force feedback input device includes a support plate 1; a bearing 2 fixedly mounted on the support plate 1; an pivotally movable operation member 3 with a protruding shaft 4 rotatably supported by the bearing 2; an actuator 5 which provides force feedback to the operation member 3, a rotary encoder 6 which detects the operating status of the operation member 3; control means 7 which outputs driving signals b and c, and a command signal d based on a detection signal a from the rotary encoder 6; and stopper means 8 which limits displacement of the operation member 3 in a predetermined direction of the operation. An external device, which is a target of the operation by the operation member 3, is controlled by driving signals output from an external controller 30. The external controller 30 is controlled by the signal d.

The driving signal b is output from the control means 7 in response to the detection signal a from the rotary encoder 6, and is input to the actuator 5. The driving signal b allows the actuator 5 to provide force feedback, such as sense of resistance and vibration, to the operation member 3 operated pivotally. In this embodiment, the actuator 5 includes a rotary motor, however, it may include a linear motor or a solenoid.

The rotary encoder 6 includes a code plate (not shown) which rotates along with the shaft 4 and a photo interrupter (not shown) which reads a detection pattern disposed on the code plate. The rotary encoder 6 can detect the rotation direction and amount of rotation (rotation angle) of the shaft 4 while the operation member 3 is pivotally operated. However, other detection means (position sensors) may be employed instead of the rotary encoder.

The control means 7 includes an input unit 71 that receives the detection signal a output from the rotary encoder 6; a memory unit 72 that stores control signals corresponding to the operating status of the operation member 3; a CPU 73 that reads, from the memory unit 72, a control signal corresponding to the detection signal a received by the input unit 71 and outputs it; a driver circuit 74 which generates the driving signals b and c and the command signal d by D/A-converting the signal output from the CPU 73 and amplifying it; and an output unit 75 which outputs the driving signals b and c to the actuator 5 and the stopper means 8, respectively, and also outputs the command signal d to the external controller 30.

The stopper means 8 includes a ratchet mechanism shown in FIG. 2. The ratchet mechanism includes an engaging plate 80 which has two groups of gear teeth 81 and 82 and is coupled to the shaft 4 of the operation member 3, and first and second ratchets 83 and 84 which are releasably engaged with the gear teeth 81 and 82, respectively. Also, the ratchet mechanism includes a pair of solenoids 85 and 86 which drive the ratchets 83 and 84, respectively. The driving signal c, which is output from the control means 7 in response to the detection signal a from the rotary encoder 6, is selectively input to the solenoid 85 or 86 to drive the ratchet 83 or 84, respectively. When the first ratchet 83 is driven by the solenoid 85, the ratchet 83 is engaged with the corresponding gear teeth 81 and restricts the rotation of the shaft 4 in one direction. Accordingly, the operation member 3 cannot be operated in the one direction. In contrast, when the second ratchet 84 is driven by the solenoid 86, the ratchet 84 is engaged with the corresponding gear teeth 82 and restricts the rotation of the shaft 4 in the other direction. Accordingly, the operation member 3 cannot be operated in the other direction.

That is, when the operation member 3 is operated to rotate in one direction and is displaced to the allowed limit of the operation range, the rotary encoder 6 detects the displacement of the operation member 3. The solenoid 85 is then driven to engage the first ratchet 83 with the gear teeth 81 and thereby the operation member 3 is instantly no longer allowed to be displaced in that direction. At this moment, the operation member 3 is not restricted to rotate in the opposite direction, thus, an operator can feel a wall effect. Likewise, when the operation member 3 is operated to rotate in the other direction and is displaced to the allowed limit of the operation range, the solenoid 86 is driven to engage the second ratchet 84 with the gear teeth 82 and thereby the operation member 3 is limited not to be excessively displaced in that direction. Accordingly, a wall effect is also produced.

Thus, in the force feedback input device according to the embodiment, at the moment when the rotary encoder 6 detects the rotational displacement of the operation member 3 that is exceeding the allowed operation limit, the ratchet 83 or 84 of the stopper means 8 is engaged with the corresponding gear teeth 81 or 82, respectively. As a result, this instantly restricts excessive displacement of the operation member 3 while allowing the operation member 3 to be displaced in the opposite direction (a "push back" operation) and, therefore, produces a wall effect and superior operability. Additionally, since a large electric current is not required for driving the ratchets 83 or 84, the stopper means 8 can be operated at low power consumption. Furthermore, if the allowed operation range of the operation member 3 is altered, a stopping position of the stopper in the operation member 3 can be readily changed by controlling the driving signal for the ratchet mechanism of the stopper means 8.

In the above-described embodiment, a pair of the solenoids 85 and 86 is used to actuate the first and second ratchet 83 and 84; however, a single solenoid may actuate the ratchets 83 and 84. Additionally, the stopper means 8 may include a one-way electromagnetic clutch having a ratchet mechanism.

Furthermore, in the above-described embodiment, a force feedback input device having a pivotally operated operation member is described. In addition to this type of force feedback input device, the present invention can be applied to a force feedback input device having a rotatably operated operation member.

What is claimed is:

1. A force feedback input device comprising:

an operation member operated by an operator;

detection means for detecting an operating status of the operation member;

an actuator for providing force feedback to the operation member;

control means for controlling the actuator based on a detection signal output from the detection means; and stopper means for restricting displacement of the operation member in a predetermined operational direction;

wherein the stopper means has a ratchet mechanism to disengage a ratchet from gear teeth and the disengagement is performed based on the detection signal.

2. The force feedback input device according to claim 1, wherein the gear teeth of the ratchet mechanism is mounted on the operation member.

3. The force feedback input device according to claim 1, wherein the ratchet mechanism comprises a first ratchet for restricting displacement of the operation member in one direction and a second ratchet for restricting displacement of the operation member in the opposite direction.

* * * * *